US008916223B2

(12) United States Patent
Burgess et al.

(10) Patent No.: US 8,916,223 B2
(45) Date of Patent: Dec. 23, 2014

(54) ROD AND COIL SHAPED FOOD PRODUCT AND METHOD OF PREPARATION

(75) Inventors: Laurie Burgess, Plymouth, MN (US); Jennifer M. Maack, Minneapolis, MN (US); Thomas Luehrs, Rogers, MN (US)

(73) Assignee: General Mills, Inc., Minneapolis, MN (US)

( * ) Notice: Subject to any disclaimer, the term of this patent is extended or adjusted under 35 U.S.C. 154(b) by 1969 days.

(21) Appl. No.: 11/272,764

(22) Filed: Nov. 15, 2005

(65) Prior Publication Data

US 2008/0038416 A1    Feb. 14, 2008

Related U.S. Application Data

(60) Provisional application No. 60/628,331, filed on Nov. 16, 2004.

(51) Int. Cl.
*A23G 3/12* (2006.01)
(52) U.S. Cl.
USPC .......................................... 426/516; 426/517
(58) Field of Classification Search
USPC ............... 426/516–518, 104, 144; 425/133.1, 425/382.3, 463
See application file for complete search history.

(56) References Cited

U.S. PATENT DOCUMENTS

| D10,882 | S | * | 10/1878 | Mills | D1/125 |
| D11,173 | S | * | 4/1879 | Mills | D1/125 |
| D134,414 | S | * | 11/1942 | Orme | D1/120 |
| 3,806,617 | A | * | 4/1974 | Smylie et al. | 426/578 |
| 4,504,511 | A | * | 3/1985 | Binley | 426/565 |
| 5,558,892 | A | * | 9/1996 | Pelka et al. | 426/283 |
| 5,609,903 | A | * | 3/1997 | Israel et al. | 426/500 |
| D381,486 | S | * | 7/1997 | Hauser et al. | D1/126 |
| 5,660,870 | A | * | 8/1997 | Schantz | 426/638 |
| 5,670,185 | A | * | 9/1997 | Heck et al. | 425/133.1 |
| 5,874,120 | A | * | 2/1999 | Borek et al. | 426/500 |
| 6,248,386 | B1 | * | 6/2001 | Willibald-Ettle et al. | 426/516 |
| D478,705 | S | * | 8/2003 | Dahl et al. | D1/125 |
| D526,762 | S | * | 8/2006 | Richey et al. | D1/125 |
| 2002/0086096 | A1 | * | 7/2002 | Fux et al. | 426/446 |
| 2003/0152681 | A1 | * | 8/2003 | Bortone | 426/516 |

FOREIGN PATENT DOCUMENTS

EP    1036500 A1 *    9/2000    ............... A21C 3/08

OTHER PUBLICATIONS http://www.hersheycanada.com/en/products/details/twizzlers/index.asp; date n/a p. 1-2.*
http://www.nextag.com/twizzlers-candy/shop-html date n/a p. 1.*

* cited by examiner

*Primary Examiner* — Steven Leff
(74) *Attorney, Agent, or Firm* — Everett G. Diederiks, Jr.; Gregory P. Kaihoi

(57) ABSTRACT

Packaged food articles comprise at least one shaped food product disposed within sealed moisture resistant packaging. The shaped food products include an axially aligned center piece or rod as a core portion and at least one string wrapped around the periphery of the core piece. The shaped food piece is fabricated from a pliable or plastic food composition such as a sweetened intermediate moisture fruit or confection such as licorice. The center piece can be provided with a multiplicity of fins extending longitudinally about the exterior periphery of the core piece. The coiled string is peelably removable from the core piece. The combination of core piece and coiled string provide a child oriented wholesome food of enhanced play value. Methods for preparing the shaped food product are described.

16 Claims, 9 Drawing Sheets

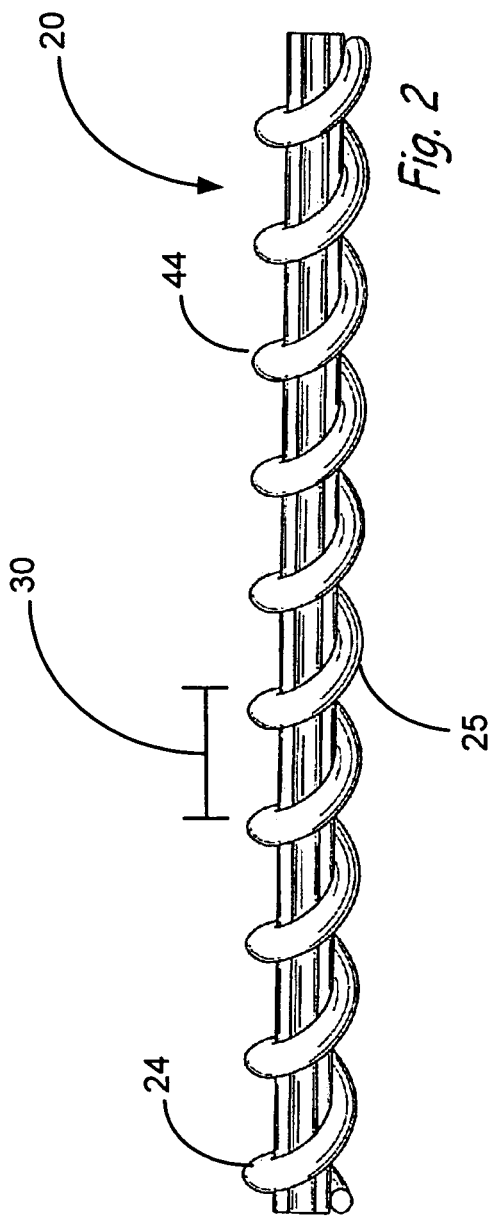
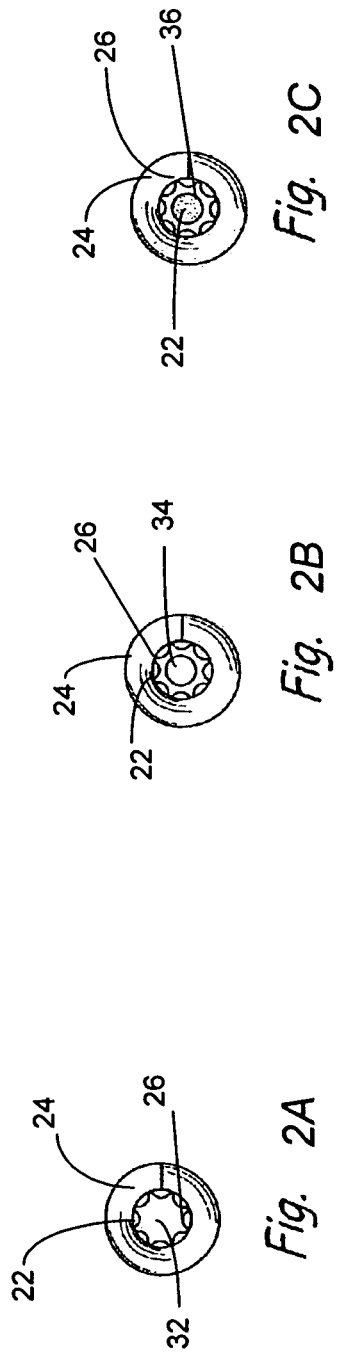

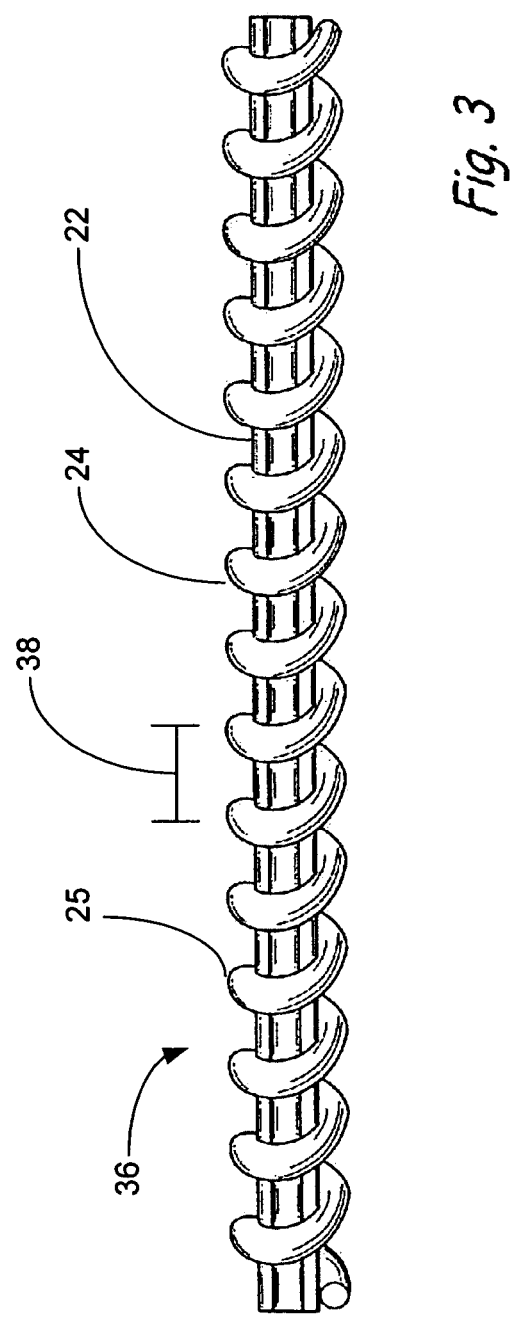

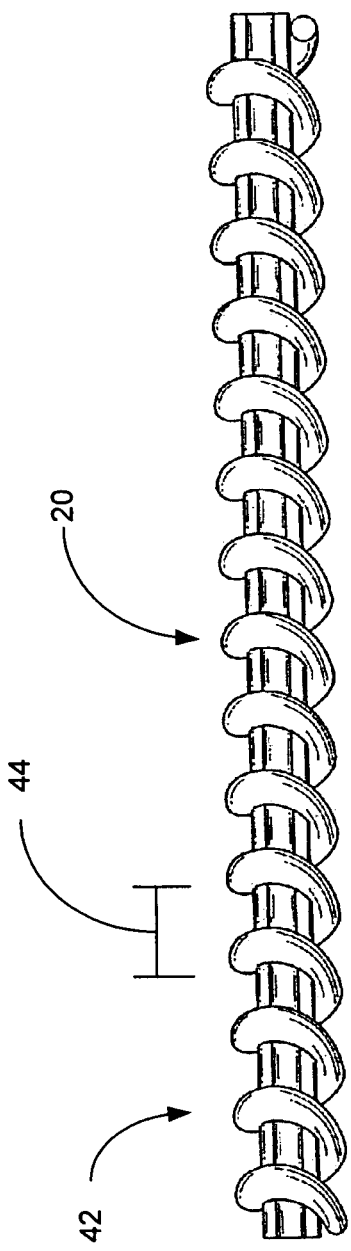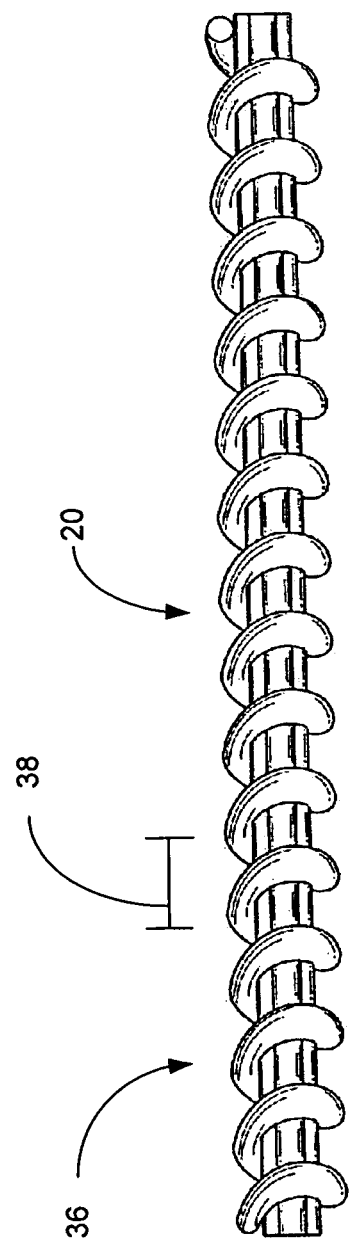

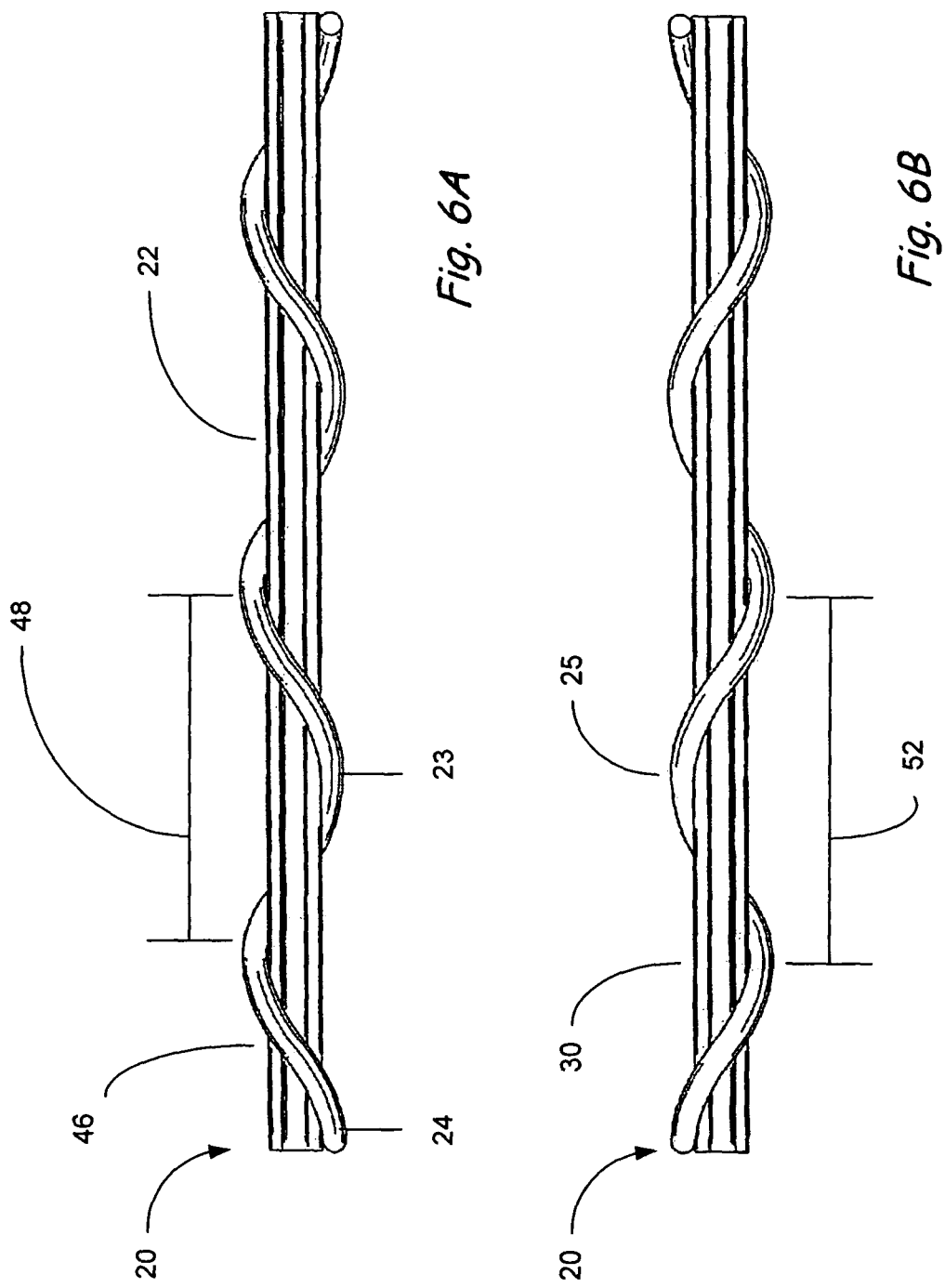

ROD AND COIL SHAPED FOOD PRODUCT AND METHOD OF PREPARATION

CROSS-REFERENCES TO RELATED APPLICATIONS

This application claims the benefit of priority under 35 U.S.C. §119(e)(1) of a provisional patent application, Ser. No. 60/628,331, filed Nov. 16, 2004, which is incorporated herein by reference in its entirety.

BACKGROUND OF THE INVENTION

The present invention relates to shaped food products, to packaged food articles including the product within a food package, and to their method of preparation. More particular, the present invention relates to extruded intermediate moisture food compositions especially dried fruit based food products in the form of a rod and a coil shaped strand wrapped around the rod and their method of preparation.

Wholesome snacks prepared from sweetened intermediate moisture shelf stable fruit or "fruit snacks" herein have expanded their popularity as food items. These dried fruit products are especially popular with children, particularly as snack or convenience foods. Their popularity has created a highly competitive marketplace. To appeal to children, the primary consumer of fruit snacks, manufacturers must introduce frequent changes to these products. New shapes, colors, textures and flavors are all avenues employed to successfully market these products. To create unique fruit snack shapes some manufacturers have changed their products to resemble popular characters from movies, television shows, cartoons, etc. To fully appreciate the need for new fruit snack shapes it is important to understand the wide variety of fruit snacks currently available.

Fruit snack compositions are sold in various physical forms and shapes such as: 1) in rolled sheet form; 2) in rolled strip form; 3) in string form mounted on a U-board; 4) soft center filled pieces, and 5) in gelled bite size pieces of various shapes or in gelled bite size piece form prepared by starch molding. The products are typically packaged in a moisture impermeable container such as flexible laminated film pouch fabricated to include a moisture barrier layer.

A particularly popular fruit snack available in rolled sheet form is sold under the Fruit Roll-Ups brand. Popular products in rolled strip form are sold under the Fruit By The Foot brand (see also, commonly assigned U.S. Pat. No. 5,455,053 entitled "Rolled Food Item" issued Oct. 3, 1995). Food products in string form mounted on a U-board were sold under the String Thing® mark while other products in bite size pieces of various shapes are sold under various brands. (See, for example, commonly assigned U.S. Pat. No. 5,942,268 entitled "Embossed Shape Food Item" issued Aug. 24, 1999 to Zimmermann et al.). Soft center filled piece products are described in U.S. Pat. No. 4,853,236 entitled "Dual Textured Food Piece Of Enhanced Stability Using An Oil In Water EMULSION" (issued Mar. 18, 1988 to Langler et al.) while apparatus and fabrication methods therefor are described in U.S. Pat. No. 5,208,059 entitled "Dual Textured Food Piece Fabrication Apparatus" (issued Jun. 10, 1992 to Dubowik et al.).

In other variations, all or a portion of the fruit material is substituted with pure sugars. Such low fruit, high sugar formulations can be flavored with fruit flavors and/or other flavors. Within this general similarity, however, the particular methods of preparation, product formulations and apparatus used to prepare particular products vary considerably. Moreover, such variations are highly interdependent. Formulations and method steps suitable for one product form might or might not be suitable for another product form. Also, such products can be fortified with vitamins and minerals, especially calcium for growing children.

The variety of fruit snack shapes including popular movie and TV character shapes introduce an element of fun or fantasy to the eating experience described as play value. Play value as it relates to fruit snacks is the ability to manipulate a product in a fun or amusing manner. In its more imaginative form, play value entails shaping or coloring a product to represent an unusual object that relies upon the child to discover a use or method to disassemble the product before consumption. The more discoveries built into a fruit snack the greater the amusement and appreciation by children. The interaction of two or more food pieces is especially amusing when disassembly can easily be achieved and it yields an unexpected result.

Disassembly of fruit snacks would require an initial connection of fruit pieces that could be peeled apart easily. The concept of a peelable fruit snack is often associated with the removal of a support material or backing paper from the food item. The act of peeling away the food item before consumption adds immeasurable play value. Therefore, it is highly desirable to create fruit snacks composed of two or more individual fruit pieces that are peelably attached, meaning they easily disassemble by peeling away from each other.

Broadly, fruit snacks are prepared from wet mixtures of various fruit materials and added ingredients possibly with extra water that are cooked and worked at elevated temperatures and dried, if necessary, to desired moisture contents to form hot plastic paste or fluid formable fruit masses. The formable fruit masses are then formed into articles of desired shapes and sizes. The present invention is directed toward those articles and improvements in the methods of preparation of the hot plastic paste or fluid formable fruit masses and their formation into various suitable shaped and sized pieces particularly rod and coiled shaped strands.

In view of the current state of the intermediate moisture food art, there is a continuing need for new and improved shapes and methods for preparing intermediate moisture food products. The present invention satisfies this need by providing distinctively shaped food articles and their method of preparation such that they have inherent play value. In part, the present invention involves providing a hot viscous sweetened fruit fluid or slurry of increased solids intermediate product that nonetheless has lower or comparable viscosities that allows for successful forming into shaped intermediate moisture food products especially rod and coiled shaped products.

It has been surprisingly discovered that the above objectives can be realized and superior dried sweetened fruit products provided by extruding a plastic confectionery mass formed such as, from fruit based materials, supplemental ingredients and moisture.

It is thus an object of the present invention to provide a rod and coiled strand fruit snack where the coiled strand can be peeled away from the rod.

It is another object of the present invention to provide a rod and coiled strand fruit snack where the rod element and the coiled element are of approximately equivalent weights.

It is yet another object of the present invention to provide a rod and coiled strand fruit snack where the coiled element is approximately three times the length of the rod element.

It is still another object of the present invention to create a rod and coiled strand fruit snack utilizing extrusion technology to form the final shape of the product including winding the coiled strand around the rod element during manufacturing.

SUMMARY OF THE INVENTION

In its product aspect, the present invention is directed towards a shaped food product of enhanced play value in the form of a central piece or rod and a string removably coiled around the rod. The food product of the present invention in its preferred embodiment is a confection and/or a sweetened, intermediate moisture fruit composition. Both the rod and coiled strand are each fabricated from an intermediate moisture plastic, extrudable food composition comprising about 40% to 70% nutritive carbohydrate sweeteners and bulking agents; 10% to 30% starch, 0.1% to 5.0% gelling agents, about 0.1% to about 5.0% of an edible organic acidulant, 2% to 10% lipids including emulsifiers and about 5% to 25% moisture. The food products have a water activity ranging from about 0.50 to 0.75. The rod and coiled strand have a length ratio of 1:3 respectively and approximately equal weights. The rod and/or coiled strand have at least one exterior fin and the coiled strand has at least three coils per unit length of product. The rod and coiled strand can be compositionally similar, compositionally different, colored and flavored differently or combinations thereof. Similarly, the core of the rod or string can be compositionally similar to its exterior or different than its exterior. Compositional differences include but are not limited to confectionery or non-confectionery formulations, texture, density, aeration, viscosity and moisture content. An exemplary compositional difference, such as one based upon level of aeration would be food products having first portion with a density of 1.2 g/cc and a second portion with a density ranging from about 0.85 to 1.0 g/cc. The centerpiece can be a rod or a tube, wherein the core is hollow. The finished piece can be packaged and sold with or without various toppings or coatings such as wax, oil, sugar, citric acid, color, flavor and confectionery pieces including specialty confections (e.g. edible glitter) and other appearance modifying agents.

In its process aspect, the present invention resides in methods of preparing intermediate moisture sweetened fruit products prepared by extrusion. The methods comprise the steps in sequence of:

Providing a slurry gel base comprising nutritive and/or non-nutritive carbohydrate sweeteners, lipids, bulking agents, sufficient amounts of a gelling agent (such as carrageenan, xanthan gum, locust bean gum, konjac, carboxymethyl cellulose, pectin, agar, flour and/or starch), sufficient amounts of an emulsifier, optionally an insoluble calcium phosphate of the prerequisite particle size to provide a total calcium content of about 50 to 1500 mg calcium per 1 oz of product (0.15 to 5.5% by weight calcium) and moisture;

Adding sufficient amounts of an edible organic acidulant to the fruit base to provide a gellable fruit base having a pH ranging from about 3.0 to 5.5 to form a calcium fortified gellable base;

Cooking the mixture;

Extruding the calcium fortified fruit base into rod and coiled strands at a linear rate ranging from about 2-15 cm/s for the center piece or rod and about 3-45 cm/s for the coiled strand portion; and curing and/or cooling and cutting the final product for subsequent packaging.

BRIEF DESCRIPTION OF THE DRAWINGS

The illustrative embodiment may best be described by reference to the accompanying drawings where:

FIG. 2 is a side elevation view of the left coiled shaped food product of FIG. 1 of the present invention.

FIG. 2A is an end view of the shaped food product.

FIG. 2B is an end view of a shaped food product but having a tube or hollow center piece.

FIG. 2C is an end view of the shaped food product having a core portion fabricated with a different composition.

FIG. 3 is a side elevation view of another embodiment of the shaped food item of the present invention having a left hand coiled string having greater number of turns per unit length.

FIG. 5A is a side elevation view of a of the food item similar to that of FIG. 3 in having greater number of turns per unit length but having right hand coil orientation.

FIG. 5B is a side elevation of the left coiled shaped food of FIG. 3 but of inverted position to better compare with the right coiled food product of FIG. 5A.

FIG. 6A shows a side elevation view of a rod and coiled string shaped food item with a decreased number of coils per unit length directionally oriented right.

FIG. 6B is a side elevation view of shaped food product having a decreased number of coils per unit length directionally oriented left.

Figure 1:
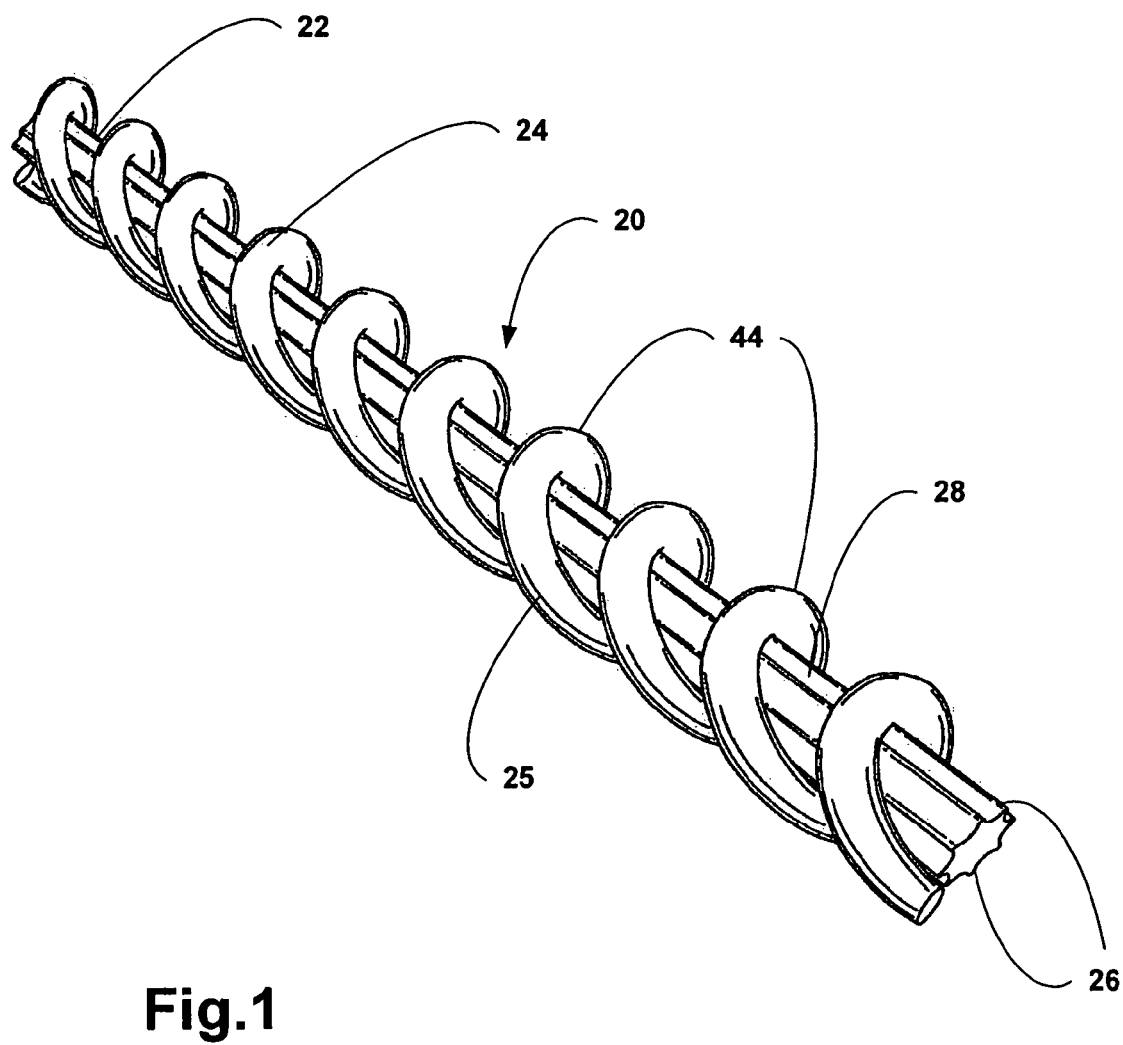
FIG. 1 is a perspective view of a rod center piece and coiled string shaped food product of the present invention having a left hand coil orientation.

The figure is drawn for ease of explanation of the basic teachings of the present invention only; the extensions of the figure with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the figure of the drawings, the same numerals designate the same or similar parts. Furthermore, when the terms "side", "end", "bottom", "first", "second", "inside", "upper", "lower", "outer", and similar terms are used herein, it should be understood that these terms have reference only to the structure shown in the drawings as it would appear to a person viewing the drawings and are utilized only to facilitate describing the illustrative embodiment.

DETAILED DESCRIPTION OF THE INVENTION

The present invention provides improved, shaped intermediate moisture food products especially confections or dried fruit based food products and their methods of preparation. Each of these components as well as product properties, preparation and use are described in detail below.

Throughout the specification and claims, percentages are by weight and temperatures in degrees Centigrade unless otherwise indicated. Each of the referenced patents and applications are incorporated herein by reference.

Referring now to FIG. 1, there is shown a perspective view of a shaped food piece of the present invention generally designated by reference numeral 20. In the preferred form, the shaped food piece 20 is fabricated from a pliable or plastic food composition such as confectionery compositions, a sweetened intermediate moisture fruit composition, or a flour confection such as licorice. The shaped food article 20 includes an extended center, centerpiece or core piece 22 such as a rod and one or more (a plurality or multiplicity) string(s) 24 wrapped around the periphery of the core piece 22 for at least one complete revolution forming at least one on rib 25. In a preferred embodiment, the string 22 is wrapped around for at least two complete rotations around center piece 20 to form a coil. As can be seen in FIG. 1, the coil can be directionally coiled left and form a left hand coil 44. In the preferred form, the center piece 22 is in the form of a solid rod although hollow tubes are contemplated or rods having a core portion of different color, flavor or even composition (better shown in FIG. 2A-2C). The center piece 22 in cross section is preferably non round. FIG. 1 shows that the non-circular preferred feature can be provided by having the core piece include a plurality of integral fins 26 projecting outwardly from the outer core piece surface 28 such as the eight fins depicted although greater, lesser and no fins (not depicted) are contemplated. In preferred form, these ribs extend longitudinally and substantially parallel to the rod 22 although a series of spaced rings (not depicted) can be used. FIG. 1 depicts that the fins are continuous although discontinuous ribs or rings are also contemplated. In less preferred embodiments, the longitudinally extending ribs 26 themselves wrap around the center piece 22. The center piece 22 will preferably have at least one fin 26, preferably about 3-12 fins, more preferably 6-10 fins and in the most preferred form eight equally spaced fins 26. In one embodiment, the core piece is a rod about 8 mm in diameter and each fin is about 1 mm in thickness to provide a core piece having a total or apparent diameter of about 10 mm. In preferred form the core piece 22 has an apparent diameter ranging from about 5-15 mm. Preferably, the fin thickness ranges from about 0.5 to 2 mm, preferably about 1 mm. As will be explained in greater detail below, the fins 26 reduce surface-to-surface contact between the center piece 22 and the string(s) 24 and thus provide greater ease and assurance of convenient peelability of the coiled string from the center piece 22. In still another embodiment (not shown), the coiled string 24 can be provided with a fin or ring feature alone or in combination with the fin or ring on the center piece 22. Providing either the center piece 22 or string 24 with fins 26 creates a reduced surface area and preferably a non-contiguous contact between said rod 22 and string 24 that improves the ability to peel the string 24 away from the center piece 22.

In the preferred embodiment, the shaped food article has one straight center piece 22 and one or more coiled strings 24, preferably one, coiled around the center piece 22. The straight center piece 22 and coiled string(s) 24 are thus to be distinguished from three strings that are merely twisted around a common line of axis or interwoven to form a braid. However, in other embodiments (not shown), the center piece can be curved to form an arc or even a ring.

In one embodiment, the ratio of the (apparent) diameter of the string piece 24 to the (apparent) diameter of the center piece 22 ranges from about 1:1 to about 1:3, preferably about 1:2. In one preferred embodiment, the string piece 24 is coiled around the center piece 22 with sufficient number of turns such as to provide the string with a length (unstretched) that ranges to the length of the core piece (unstretched) in a ratio of about 1:2 to about 1:5, preferably about 1:3. Notwithstanding that the string element(s) can be three times the length of their accompanying core piece 22 in the preferred embodiment both core piece 22 and string piece 24 are of substantially equal weights. One string 24 is also preferred because increasing the number of strings 24 coiled around the rod 22 requires a reduction in the overall length of said strings used. This length reduction is necessary to allow the spacing required to coil more than one string 24 around the center piece 22.

In the preferred embodiment of product 20 depicted in FIG. 2, the article 20 is about 17.8 centimeters (cm.) in length (about 7 inches) and includes about 10 turns or ribs per length of 17.8 cm. Thus, article 20 has a string 24 in the form of a coil having a pitch feature 30 having a "17.8/10" pitch. This pitch feature is descriptive of the distance along the rod from one longitudinally extending rib 25 to a corresponding point on an adjacent longitudinally extending rib 25. As explained in greater detail below, a greater or lesser number of turns of the string per unit length can be provided by adjusting the rotational speed of a die and product flow rate producing the string.

In FIG. 2A, it can be better seen that coiled string 24 is in discontinuous or intermittent contact with the center piece 22 by virtue of the fins 26. Such intermittent contact between the center piece 22 and the string 24 can greatly improve the desirable peelability feature of the present products.

FIG. 2A also depicts the preferred embodiment wherein the center piece 22 is fabricated in the form of a solid core 32, i.e., as a rod. In this embodiment, the entire center piece 22 is compositionally the same material, including the core. In contrast, FIG. 2B shows another embodiment of the present invention wherein the center piece 22 is a tube with includes a hollow core 34. FIG. 2C shows still another variation wherein the center piece 22 includes a core portion 36 fabricated from a compositionally different material. It is anticipated that in alternative embodiments that the string 24 can also be a tube (not depicted) with a hollow core or contain a compositionally different core.

Referring now briefly to FIG. 3, another embodiment 36 of the shaped food item of the present invention 20 is depicted having a left hand coiled string but having greater number of turns per unit length than the embodiment depicted in FIG. 2. The shaped food piece 36 contains 15 helical ribs 25 per final product unit length of 17.8 cm. (7 inches). Thus, product 36 has a different pitch value 38; namely, a "17.8/15" pitch. As a consequence the ratio of length of the string 24 to center piece 22 can range about 4:1. Food product embodiment 36 is thus shown extending left-to-right.

Figure 4:
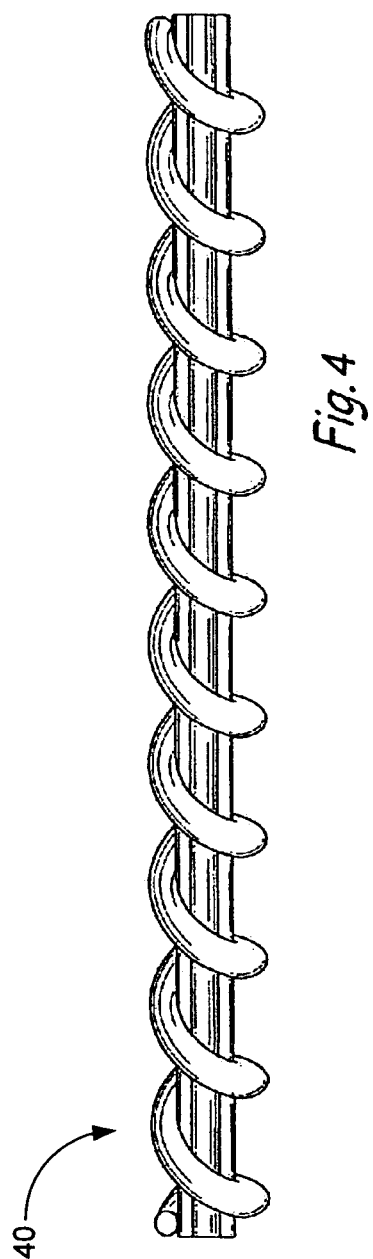
FIG. 4 is a side elevation view of a rod and coiled string shaped food item similar to FIG. 2 but having a right hand coil orientation.

FIG. 4 shows a coiled string shaped food item 40 (similar to the product 22 depicted in FIG. 2) but having a right hand coil orientation. It will be appreciated that the two embodiments are not simply inverted in position but rather are mirror images. Similarly, FIG. 5A shows a right oriented coiled string shaped food item embodiment 42 but having a pitch value 44 of "17.8/15". In addition to the first right oriented coil feature described, a second distinguishing feature of the embodiment of food article 42 is an increased number of helical ribs 25 per unit length of the piece.

For ease of comparison, FIG. 5B shows the shaped food product embodiment 36 of FIG. 3 but in an inverted position extending right-to-left.

Referring now to FIGS. 6A and 6B, the converse is depicted in yet another embodiment to the present invention. FIG. 6A shows a side view of a right directionally coiled rod and coil shaped food article 46 having a decreased number of helical ribs 25. Article 46 has a pitch value 48 of "17.8/3", i.e., only 3 ribs per 17.8 centimeters (7 inches) in length. Such a larger pitch value can be accomplished by decreasing the rotational speed of the die and decreasing the flow rate of product producing the string. In this embodiment, the ratio of the length of string 24 to center piece 22 is about 1.5:1 and the weight ratio of the string piece 24 to center piece 22 is about 1:2. FIG. 6B shows and embodiment 50 of the left coiled shaped food piece 20 that has a pitch value 52 also of "17.8/3", i.e., only 3 ribs per 17.8 centimeters (7 inches) in length. Adjusting the rotation speed of the extruder die and the flow rate of product from the die can create a wide range of helical ribs 25 per unit product length. It is anticipated that between 2 and 20 helical ribs 25 can be obtained the preferred embodiment containing between 8 and 10.

Figure 7:
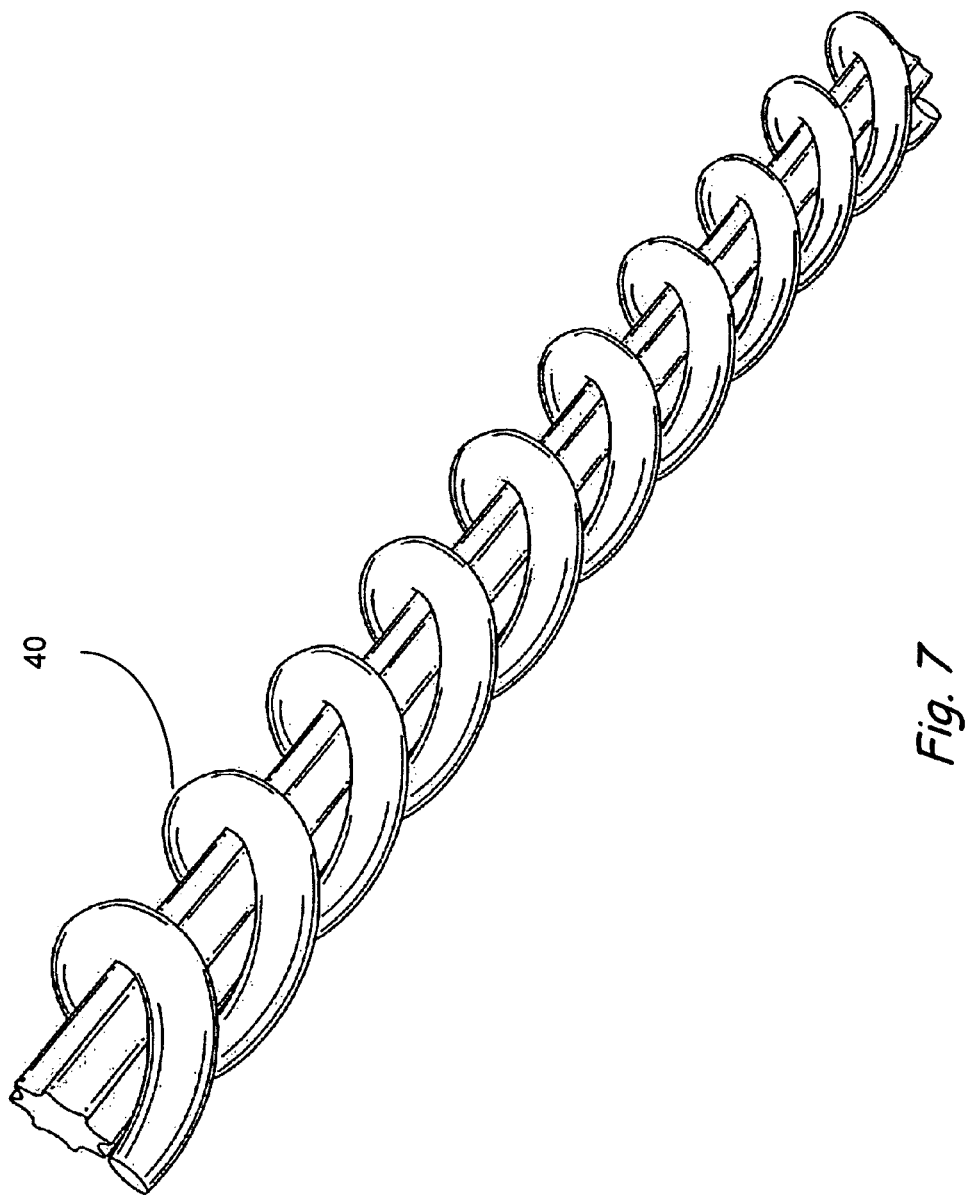
FIG. 7 is a perspective view of a rod and coiled string shaped food product of the present invention similar to FIG. 1 but having a right hand coil orientation.

Referring now briefly to FIG. 7, there is shown a perspective view (similar to FIG. 1) of the embodiment 40 of the shaped food piece, namely a "17.8/10" pitch right coiled embodiment.

Figure 8:
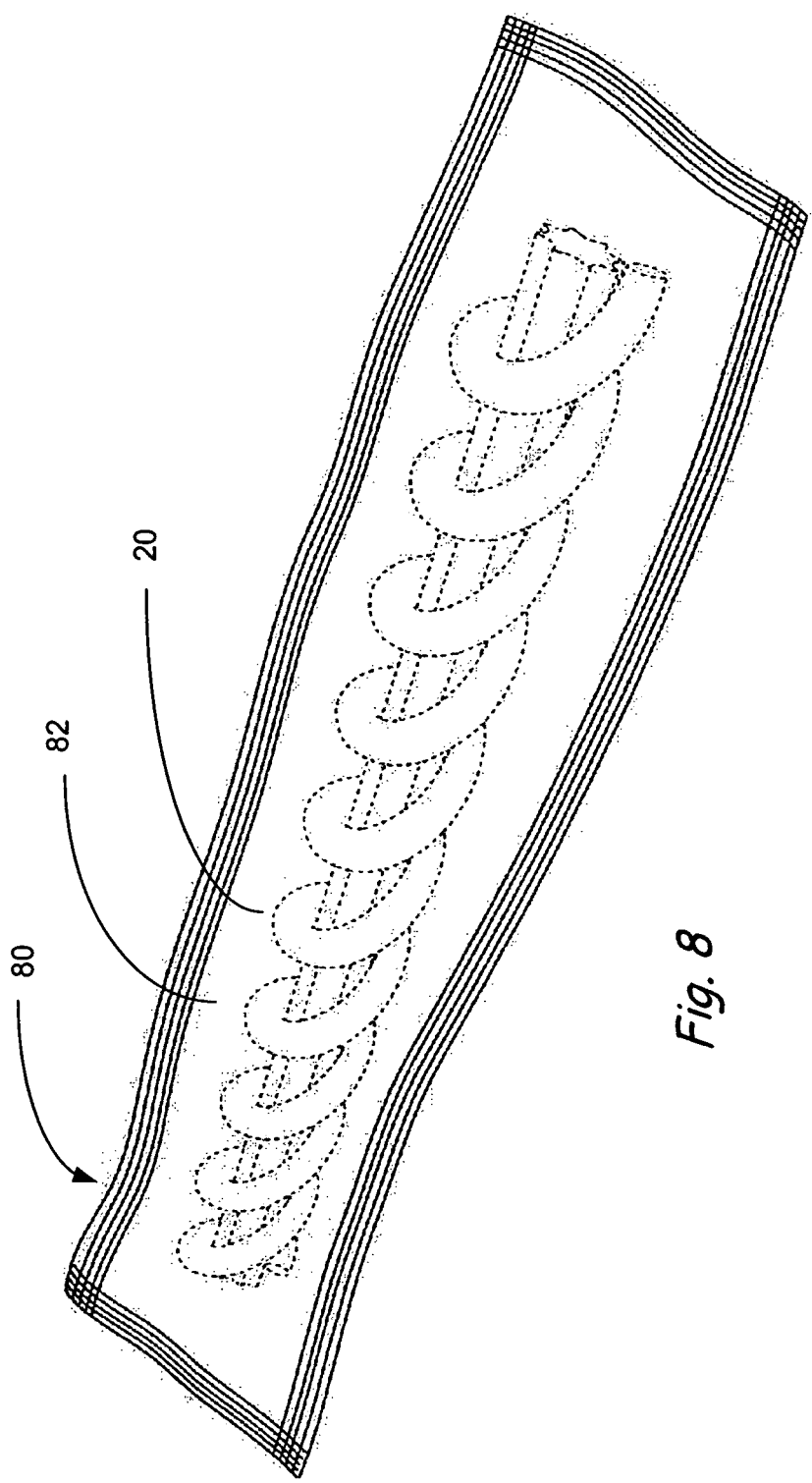
FIG. 8 is a perspective view of a packaged food article of the present invention including the shaped food product of FIG. 1 disposed within a food package.

Referring now to FIG. 8, there is shown a perspective of the packaged food article of the present invention generally designated by reference numeral 80. FIG. 8 depicts that article 80 includes the shaped piece 20 disposed within a food package or wrapper 82. In the preferred form the food package 82 is constructed of flexible packaging film having moisture barrier properties. In the particular embodiment depicted, the food package 82 includes four seals including first and second opposed and spaced apart transversely extending end seams 83 and 84 as well as first and second opposed and spaced apart longitudinally extending side seams 85 and 86. However, numerous sealing configurations, pouches or trays with film closures offering a similar moisture barrier are perfectly acceptable alternatives. For example, one side seam, e.g., 85 can be substituted with a curvilinear portion to form a tube into which the shape food piece 20 is disposed. In another variation, both side seams can be substituted with a side fin or lap seal (not shown). In one variation, the package is vacuum sealed. In another variation, the package includes a headspace gas. In preferred form, the package is both imperforate and includes moisture barrier properties to prevent moisture loss from the food piece. Avoiding such moisture loss is important to maintaining desirable textural properties, i.e., preventing the product from hardening and staling. Also, minimizing moisture loss is important to retaining the desirable plastic, pliable properties of the food product. The desirable, peelable feature degrades with moisture loss and associated diminution of the plastic pliable nature of the food product. Suitable food packaging, including especially heat sealable flexible food grade packaging film is well known and the skilled artisan will have no difficulty in selecting useful materials. In one variation, the packaging is entirely opaque. In other variations, at least a portion of the packaging includes one or more transparent window(s) through which to view the food item 20 disposed within the package 82. Also, while FIG. 8 depicts a single food piece 20 disposed within package 82, any desired number of pieces 20 can be packaged.

The present shaped food products can be fabricated from a variety of food formulations that are intended to provide intermediate moisture products of plastic qualities especially confections. Generally, these formulations for the shaped food article comprise various food solids and moisture. For confections, these formulations can include one or more sugary materials such as fruit materials such as fruit juice or puree; or a nutritive carbohydrate sweetening agent. The formulations can also include; a bulking agent(s); a lipid(s) (fats, oils and/or fatty emulsifiers); and optionally nonnutritive and high potency sweeteners and flavorants. Most commercially available gelling agents are suitable for use in this product; pectin, agar, carrageenan, starches, gelatin, xanthan gum, locust bean gum, flour and mixtures thereof. While the present invention is directed foremost to confectionery products such as fruit snacks, the skilled artisan will appreciate that the present invention finds suitability for use in connection with other plastic intermediate moisture food products such as meat emulsions (for preparing meat snacks) or pet treats.

Flour based formulas, such as licorice, should not be confused with fruit based formulas that contain lower levels of flour and/or starches serving as gelling agents. However, in a less preferred embodiment, such higher percentage flour formulas are suitable for making the rod and coil shaped fruit snack of the present invention. For example, a variety of flour thickened confection (i.e., flour based) compositions are well know, especially licorice compositions (see for example, U.S. 3,806,617 issued Apr. 23, 1974, to Y & S Candies, Inc.). Such flour based confections are described therein as, generally comprising about 25-35% flour; 15-35% sugar(s); 35-45% corn syrup; 20-30% molasses and 1-3% shortening as well as minor levels of various emulsifiers, flavor, and color and optionally low levels of fruit flavoring or fruit based ingredients. These flour based confections are less preferred because their texture does not reliably support high rpm rotating die heads needed for a high speed manufacturing process. Sufficient texture improvement to achieve high speed manufacturing from flour and/or starch based systems can be achieved with the addition of other gelling agents previously described.

In the most preferred form, the shaped food article 20 can be an intermediate moisture (i.e., having a water activity ranging from about 0.50 to about 0.75) plastic pliable fruit based material of the same type used in the first, solid or hard portion or region of the dual textured food piece described in U.S. Pat. No. 4,847,098 issued Jul. 11, 1989 to J. E. Langler and in U.S. Pat. No. 4,863,236 issued Aug. 1, 1989 to J. E. Langler; each entitled Dual Textured Food Piece of Enhanced Stability. Dual Textured Food Pieces described in these patents sold under the Fruit Gushers® mark by General Mills, Inc.

In the most preferred form the shaped food article 20 uses fruit puree. Fruit puree includes both heat treated and non heat treated fruit mixtures of fruit juice, pieces, pulp and other edible portions of the fruit all prepared in the form of a semi-solid or liquid. Fruit purees selected can be of any variety based on fresh, frozen or otherwise processed fruit and their juices. In a less preferred embodiment dried forms of fruit, such as apple powder, may be used. Any edible variety of fruit can be utilized for example; pineapple, lemon orange, peach, pear, grape, mango, apple, tomato, blackberry, blueberry, apricot, strawberry, currant, acerola and cherry or mixtures thereof. The most preferred fruits include; grapes, apples and pears. In less preferred embodiments the food materials can include vegetables such as pumpkin puree.

Fruit puree also provides some sweetness to the product, however the remainder is provided by nutritive carbohydrate and/or nonnutritive high potency sweeteners. Nutritive carbohydrate sweeteners are those commonly used in the food industry. Such sweeteners can include sucrose, invert sugars, honey, dextrose, maltose, lactose, maple syrup, corn syrup, fructose, high fructose corn syrup and corn syrups solids. The preferred nutritive carbohydrate sweeteners for the shaped food article 20 include corn syrup and/or maltodextrin. Individual and combined nutritive carbohydrate sweetener use is anticipated. In other embodiments, all or a portion of the nutritive carbohydrate sweetening ingredient can be supplied by tagatose. The preferred use of nutritive carbohydrate sweeteners does not preclude the use of high potency protein sweeteners such as, aspartame, cyclamates, saccharine, thaumatin, monllin, acesulfame potassium, or sucralose and mixtures thereof. If such high potency sweeteners are used, such ingredients can comprise about 0.001 to about 0.5% of the finished products (dry weight basis)

Lipid agents are another component of the shaped food article 20 added to improve the organoleptic qualities of the finished product. Some modest level of fat provides an improved product mouthfeel best described as lubricious. Lipid agents suitable for use in the shaped food article include any edible lipids for example oil, fat or shortening, commercially available. In the preferred embodiment such lipid agents will include those from plant sources and solid at room temperature. Oils are suitable for use in the shaped food article 20, however they are less preferred because they can produce undesirable product attributes.

To disperse the lipid and water phases of the shaped food article emulsifiers are added. Not only do they stabilize the sweetened intermediate moisture fruit based mass, they act as release agents from manufacturing equipment, packaging materials and teeth upon consumption by the end user. Any edible emulsifier is suitable for use in this product including; mono and diglycerides and mixtures thereof and lecithin. In the preferred embodiment monoglycerides are used.

In the preferred embodiment, for ease of manufacturing both the core piece 22 and the string elements 24 are preferably fabricated from a similar composition although preferably differently colored and optionally flavored.

Figure 9:
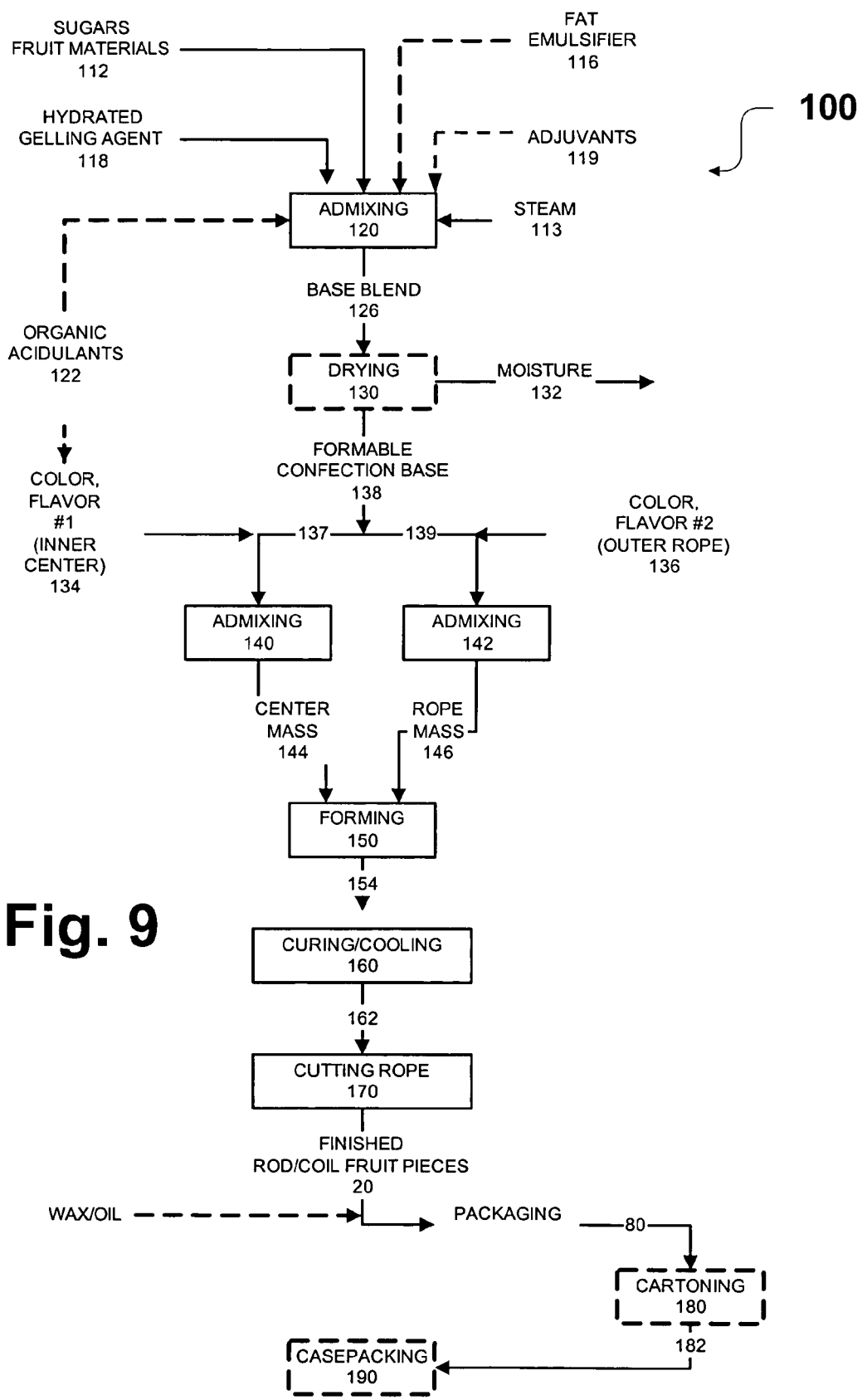
FIG. 9 is a block flow diagram of a process for making the shaped food product of the present invention.

Reference is now made to FIG. 9 which illustrates one preferred method of preparing the present shaped food products. The particular embodiment represented in FIG. 9 is directed towards preparing a fruit based finished product and generally designated by reference number 100. The method of preparation 100 can comprise a step of admixing or cooking 120 various food and materials such as sugars and fruit materials 112; a gelling agent 118 preferably pre-hydrated; lipid and emulsifiers 116, if desired; to form a blend and adding sufficient amounts of heat such as by steam to cook or form a hot (90 to 146° C.) base blend 126. In one embodiment, the base blend is provided from the cooking or admixing step 120 at finished moisture content of 5-20% preferably 10-15%. In another embodiment, the base blend 126 can be subjected to and the present methods comprise a drying step 130 at atmosphere or under a vacuum to remove excess moisture 132 to provide a formable confection or fruit base 138. If desired various food adjuvants 119 such as vitamins, minerals (e.g., calcium), fiber (e.g., inulin), high potency sweeteners, can also be included in the cooking or admixing step 120, and/or admixing step 140 and 142 and/or to the formable confection base 138 prior to admixing step 140 and 142.

In the preferred embodiment, a single batch or supply of bland or unflavored material is used to provide the formable confection base 138. The formable confection base 138 can be split or partitioned into at least a core mass fraction 137 and at least one string mass portion 139. In less preferred embodiments, the core mass fraction 137 and the string mass portion 139 are each supplied from their respective make-up systems (not shown) such as when different food formulations are employed to provide the center piece and coiled string portions.

In certain embodiments, one or more of the several steps can be practiced in a single piece of equipment such as a twin screw extruder. In other embodiments, each step or sub-step can be practiced in separate equipment as convenient. For example, the admixing step can be practiced in a conventional mixing kettle such as a Groen kettle while the cooking and moisture removal step can be practiced in a heated agitated cooking vessel such as is available from Bepex Corporation or a drum dryer or by applying a vacuum to an extruder. The skilled artisan will also appreciate the ability to use combinations of the above equipment to achieve the desired outcome.

The method 100 can include a step of admixing 140 a first flavor and/or color to the 134 to the first core mass fraction 137 to form the flavored and colored center mass 144. Method 100 can also include a step of admixing 142 a second color and/or flavor 136 to the second rope mass fraction 139 to form the flavored and colored mass 146. In certain variations, the admixing steps 140 and/or 142 can include addition of an ingredient to assist or allow for the gelling agent to subsequently set. For example, if an acid or ion setting gelling agent is employed, the step(s) can include the addition of an edible organic acid 122 such as citric acid, malic and/or succinic acids (or their sodium or potassium salts). However, the method can also include organic acids addition simply to provide a desirable taste or acidity. In other variations employing a calcium setting gelling agent, the methods can include addition of a calcium salt to facilitate the gelling action of the calcium setting gelling agent. Also, the later addition steps can be practiced to admix temperature sensitive ingredients such as certain vitamins, minerals and sweeteners. Later addition of these ingredients has the added benefit of preventing common manufacturing problems such as scaling, the collection of these unincorporated ingredients on the equipment.

Thereafter, the methods 100 can include the step of forming the center mass 144 into a rope having the peripheral shape, diameter and size as described above suitable for the center piece. Also, methods 100 can include the step of forming the rope mass 146 into a rope having the peripheral shape, diameter, and size as described above suitable for the center piece coiled string. Conveniently, the forming steps can be practiced in a co-extruder such as with a stationary, central, cent shaped die preferred, or rotating, less preferred, for forming a continuous shaped rope (for the center piece) and co-extruding with a rotating peripheral shaped die. In another version the central die can be substituted with a die counter rotating to the string die. Equipment suitable to practice such co-extrusion are known and are described in, for example, commonly assigned U.S. Pat. No. 5,695,805 "Multistrand Twist Cereal Pieces" (issued Dec. 9, 1997 to Borek, et al) or U.S. 5,874,120 "Method For Preparing Multistrand Twist Food" (issued Feb. 23, 1999 to Borek, et al). The die can be constructed to impart the diameter and peripheral feature such as the desired number of fins to the extrudate rope for the center piece.

In the preferred embodiment, mass 144 and mass 146 are each maintained at a temperature of about 60-120° C. (140-248° F.) immediately prior to co-extrusion. Good results are obtained when the center piece rope is extruded at a rope linear rate of about 2-15 cm/s (3.94-29.53 ft/min) while the string portion is extruded at a linear rate of about 3 to 45 cm/s (7.87-88.58 ft/min) to form a shaped continuous co-extrudate rope 154. In preferred embodiments, a manifold is provided with a plurality of such rotating head to provide multiple shaped extrudate streams 154. The rotating die(s) can be rotated at speeds ranging from about 75 to 4000 RPM, preferably about 100 to 2000 RPM, and for best results about 350 RPM. Extrusion die pressures can range from about 690-2750 kilopascals ("kPa") (100-400 psi).

The co-extruded shaped extrudate rope(s) 154 can be conveyed away on a takeaway conveyor and allowed to cool and methods 100 can include a cooling or setting step set 160 to set the gel. If desired, the ropes can be conveyed through a cooling tunnel supplied with chilled air to reduce the time required to cool and set the extrudate rope to form cured ropes 162. Good results are obtained when the cured ropes have temperatures ranging from about 25-45° C. (77-113° F.), although the product can be packed at higher or lower temperatures.

Thereafter, the methods can include the step of cutting the cured ropes 162 to form the finished center piece and helical string or rod/coil pieces 20 of the present invention. Conveniently, the continuous shaped cured rope(s) 162 are sectioned using a guillotine cutter, although other means for partitioning into individual pieces can be used e.g. a water knife or rotary cutter blade. In preferred form, the individual pieces range from about 10-25 cm (3.94-9.84 inches) in length, preferably about 15-20 cm (5.91-7.87 inches) and for best results about 1617-18 cm (6.30-7.09 inches). Also, in preferred form, the individual pieces each weigh about 15-30 g each, preferably about 20-25 g each.

Optionally, the finished pieces 20 can be provided with a topping such as a oil and/wax coating. In other embodiments, a variety of particulate toppings such as nut pieces, confectionery pieces including specialty confections (e.g. edible glitter) and other appearance modifying agents, powdered or granular sugar, acid or flavor or combinations thereof can be applied.

Thereafter, the pieces can be packaged in suitable packaging to provide the finished shaped food articles 80 of the present invention. The food articles are suitable for individual sale.

Multiple (e.g., 2-12) individual food articles 80 can be added to a carton in a cartoning step 180 to form cartons 182 suitable for individual retail sales such as in grocery store for at-home consumption and use. Multiple cartons 182 can be formed into cases in a case packing step 190 for convenience of mass distribution and sale.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of preparing a shaped food product, comprising the steps of:
    A. providing a hot plastic food mass having a temperature of between about 60-120° C.;
    B. co-extruding the hot plastic food mass to form a first extrudate rope having an exterior and at least a second extrudate rope wherein the first extrudate rope includes a longitudinally extending exterior fin and the second extrudate rope forms a helical coil around the exterior of the first extrudate rope, wherein the fin creates a non contiguous contact between said first and second extrudate ropes to form a combination center extrudate rope and a coiled string, and wherein the fin provides reduced surface-to-surface contact between the coiled string and the center extrudate rope to provide ease and assurance of peelability of the coiled string from the center extrudate rope;
    C. curing the combination extrudate rope and coiled string at a temperature of between about 25-45° C.; and,
    D. cutting the combination extrudate rope and coiled string to form individual pieces in the form of a center piece and a string removeably coiled around the center piece.

2. The method of claim 1 additionally including the step of packaging at least one of the individual pieces to form a packaged food article.

3. The method of claim 1 wherein Step B is practiced to form the helical coil having a pitch value ranging from about 0.4 inch to about 3.5 inch.

4. The method of claim 1 wherein Step B is practiced to form the first extrudate rope to have a diameter and the second extrudate rope to have a diameter in the ratio of about 1:1 to 3:1.

5. The method of claim 1 wherein Step B is practiced with a rotating die to form the second extrudate rope in the form of the helical coil about the first extrudate rope.

6. The method of claim 1 wherein Step B is practiced to extrude the second extrudate rope at an extrudate speed of 2 to 45 cm/sec.

7. The method of claim 1 wherein the plastic food mass is a confection.

8. The method of claim 7, wherein the plastic food mass is a plastic pliable fruit based material.

9. The method of claim 1 wherein the center piece and the coiled string have length ratios ranging from about 1:4 to 1:2.

10. The method of claim 1 wherein Step B is practiced to extrude at least a third extrudate rope in the form of a second coiled string helically wrapped around the first extrudate rope.

11. A product prepared by the method of claim 1 having a center piece and at least one string, coiled around the center piece that is peelable away from the center piece.

12. The method of claim 1, wherein the first extrudate rope includes multiple longitudinally extending exterior fins and the second extrudate rope is a substantially smooth rope, wherein the fins provide reduced surface-to-surface contact between the coiled string and the center extrudate rope to provide ease and assurance of peelability of the coiled string from the center extrudate rope.

13. A method of preparing a shaped food product, comprising the steps of:
    providing a hot plastic food mass having a temperature of between about 60-120° C.;
    co-extruding the hot plastic food mass to form a first extrudate rope having an exterior and a second extrudate rope;
    providing ease and assurance of peelability of a coiled string from a center extrudate rope while forming a combination center extrudate rope and coiled string constituted by the first and second extrudate ropes respectively;
    curing the combination center extrudate rope and coiled string at a temperature of between about 25-45° C.; and,
    cutting the combination center extrudate rope and coiled string to form individual pieces in the form of a center piece and a string segment removeably coiled around the center piece.

14. The method of claim 13 wherein providing ease and assurance of peelability of the coiled string from the center extrudate rope includes reducing surface-to-surface contact between the coiled string and the center extrudate rope.

15. The method of claim 13 wherein providing ease and assurance of peelability of the coiled string from the center extrudate rope includes creating a non contiguous contact between said first and second extrudate ropes.

16. The method of claim 13 wherein providing ease and assurance of peelability of the coiled string from the center extrudate rope includes forming a longitudinally extending exterior fin on the first extrudate rope and forming the second extrudate rope as a helical coil around the exterior of the first extrudate rope.

\* \* \* \* \*